(12) United States Patent
Moore et al.

(10) Patent No.: US 9,104,232 B2
(45) Date of Patent: *Aug. 11, 2015

(54) SYSTEM AND METHOD FOR CREATING AN ELECTRONIC-CALENDAR ENTRY

(71) Applicant: AT&T Intellectual Property I, L.P., Atlanta, GA (US)

(72) Inventors: Darryl Cynthia Moore, Conyers, GA (US); Edward Michael Silver

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 167 days.

This patent is subject to a terminal disclaimer.

(21) Appl. No.: 13/687,101

(22) Filed: Nov. 28, 2012

(65) Prior Publication Data

US 2013/0152008 A1 Jun. 13, 2013

Related U.S. Application Data

(63) Continuation of application No. 10/001,638, filed on Oct. 31, 2001, now Pat. No. 8,370,763.

(51) Int. Cl.
*G06F 3/048* (2013.01)
*G06F 3/01* (2006.01)
*G06Q 10/10* (2012.01)
*G06F 17/30* (2006.01)

(52) U.S. Cl.
CPC ............... *G06F 3/01* (2013.01); *G06Q 10/109* (2013.01); *G06F 17/30817* (2013.01); *H04M 2203/2072* (2013.01); *Y02B 60/144* (2013.01)

(58) Field of Classification Search
CPC ............ G06Q 10/109; G06Q 10/1095; G06Q 10/1097; G06Q 10/06; G06Q 10/1093; H04M 2203/2072

See application file for complete search history.

(56) References Cited

U.S. PATENT DOCUMENTS

| | | | |
|---|---|---|---|
| 5,559,942 A | 9/1996 | Gough et al. | |
| 5,563,996 A | 10/1996 | Tchao | |
| 5,570,109 A * | 10/1996 | Jenson | 715/823 |
| 5,855,006 A * | 12/1998 | Huemoeller et al. | 705/5 |
| 5,864,848 A | 1/1999 | Horvitz et al. | |
| 5,899,979 A * | 5/1999 | Miller et al. | 705/7.21 |
| 5,930,700 A * | 7/1999 | Pepper et al. | 455/435.3 |
| 5,970,455 A | 10/1999 | Wilcox et al. | |
| 6,006,215 A | 12/1999 | Retallick | |
| 6,039,355 A * | 3/2000 | Durand | 283/2 |
| 6,088,026 A | 7/2000 | Williams | |
| 6,089,607 A * | 7/2000 | Keeney et al. | 281/2 |

(Continued)

OTHER PUBLICATIONS

"VCalendar: The Personal Calendaring and Scheduling Exchange Format," vCalendar White Paper, www.imc.org/pdi/vcalwhite.html, (Aug. 25, 2001) pp. 1-5.

(Continued)

*Primary Examiner* — Linh K Pham
(74) *Attorney, Agent, or Firm* — Scott P. Zimmerman, PLLC

(57) ABSTRACT

Methods, systems, and products automatically creates a calendar entry for an electronic calendar application. A graphical user interface is displayed having a text field and a date and time field. Whenever a user wishes to create a calendar entry, the user populates the text field and the date and time field. The user then selects a graphical control that automatically creates the calendar entry in the electronic calendar application.

20 Claims, 5 Drawing Sheets

(56) References Cited

U.S. PATENT DOCUMENTS

| | | | |
|---|---|---|---|
| 6,236,396 B1 * | 5/2001 | Jenson et al. | 715/764 |
| 6,249,765 B1 | 6/2001 | Adler et al. | |
| 6,480,830 B1 | 11/2002 | Ford et al. | |
| 6,604,079 B1 | 8/2003 | Ruvolo et al. | |
| 6,654,735 B1 | 11/2003 | Eichstaedt et al. | |
| 6,675,356 B1 | 1/2004 | Adler et al. | |
| 6,714,222 B1 | 3/2004 | Bjorn et al. | |
| 6,760,728 B1 | 7/2004 | Osborn | |
| 7,499,537 B2 * | 3/2009 | Elsey et al. | 379/218.01 |
| 7,571,254 B1 * | 8/2009 | Canova et al. | 709/248 |
| 7,668,900 B2 * | 2/2010 | Fishman et al. | 709/203 |
| 7,721,217 B2 | 5/2010 | Bonforte et al. | |
| 7,975,072 B2 * | 7/2011 | Canova et al. | 709/248 |
| 8,229,401 B2 * | 7/2012 | Elsey et al. | 455/414.1 |
| 8,260,847 B2 * | 9/2012 | Fishman et al. | 709/203 |
| 8,365,095 B2 * | 1/2013 | Bansal et al. | 715/810 |
| 2002/0078070 A1 | 6/2002 | Eshelman et al. | |
| 2002/0165753 A1 * | 11/2002 | Worthington | 705/8 |
| 2003/0036941 A1 | 2/2003 | Leska et al. | |
| 2003/0046134 A1 * | 3/2003 | Frolick et al. | 705/8 |
| 2003/0063136 A1 | 4/2003 | J'maev | |
| 2003/0097361 A1 | 5/2003 | Huang et al. | |
| 2007/0083552 A1 | 4/2007 | Allen et al. | |
| 2008/0040192 A1 | 2/2008 | Edlund et al. | |
| 2010/0031163 A1 | 2/2010 | Espinoza et al. | |

OTHER PUBLICATIONS

"List Grabber," ListGrabber Features, www.egrabber.com/features-lg.htm, (Aug. 8, 2001) pp. 1-3.

"Address Grabber," AddressGrabber Features, www.egrabber.com/features-ag.htm, (Aug. 8, 2001) pp. 1-3.

Mahoney, B., Babics, G., Taler, A., "Guide to Internet Calendaring," Network Working Group, draft-ietf-calsch-inetcal-guide-01, www.ietf.org/internet-drafts/draft-ietf-calsch-intercal-guide-01.txt, (Jul. 18, 2001) pp. 1-17.

* cited by examiner

SYSTEM AND METHOD FOR CREATING AN ELECTRONIC-CALENDAR ENTRY

CROSS-REFERENCE TO RELATED APPLICATIONS

This application is a continuation of U.S. application Ser. No. 10/001,638, filed Oct. 31, 2001, and now issued as U.S. Pat. No. 8,370,763, and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention generally relates to electronic-calendar software applications. The present invention more specifically relates to the automated creation of electronic-calendar entries based on information extracted from other applications.

BACKGROUND

The proliferation of the "sticky note" or Post-it® note is well known. Many desktops and computer monitors are practically hidden by the small yellow note sheets. Like many office products, the sticky note has been recreated electronically on the computer.

A variety of applications exist for creating electronic notes on the computer desktop. These applications range from full-featured word-processing applications, such as Microsoft® Word, to note software, such as 3M Company's Post-it® note software. Often these notes, paper or electronic, contain date-specific information. In some cases, the date-specific information includes information a user wishes to enter into a calendar.

Increasingly, individuals store their calendar in an electronic format. Many conventional platforms and applications support electronic calendaring. Examples include Interact Commerce Corporation's ACT!™ 2000 and Microsoft® Outlook. These applications comprise an array of functions, including the entry of specific events.

Conventionally, creating event entries in an electronic calendar application by using information entered in a note-entry application can be both difficult and time-consuming. Often, the only method for transferring the data from the note-entry application to the calendar application is a manual process.

For example, a supervisor receives a call and begins taking notes in a note-entry application. As a result of a portion of the conversation, the supervisor desires to schedule a meeting involving twenty subordinates. The supervisor attaches the note to an email message and sends the message to the twenty subordinates. To create an electronic-calendar entry containing the relevant information from the supervisor, each user must (1) open the note-entry sent by the supervisor; (2) create a calendar entry on the appropriate date in their electronic calendar; and (3) cut and paste the text from the note-entry application into the text attribute of the calendar entry.

A supervisor may also simply wish to have an administrative assistant create a calendar entry. The supervisor enters the text in a text email message and sends to the message to the administrative assistant. The administrative assistant must then manually create an electronic calendar entry comprising the information.

Manual processes such as this are often error prone. Errors in the data may result in an event being entered on the wrong date and/or with the wrong textual information. If these errors result in missed appointments or deadlines, they may cause a variety of problems, including loss of revenue and embarrassment.

But manual entry is not the sole option available to the user for creating calendar entries in electronic-calendar software. An alternative is to enter the note directly into the calendar application on the appropriate date. Also, some conventional note-entry applications support the setting of alarms for a note. Although the alarm does not appear on the user's calendar, the user is able to specify date information for a note.

These conventional approaches to creating calendar entries from electronic sticky notes present many disadvantages. These disadvantages include the likelihood of error, the lack of flexibility, and duplication of both time and effort.

Entering date and non-date information directly into a calendar application is an approach that is limiting to the user in terms of both flexibility and practicality. For example, calendar entries in conventional calendar applications include a plurality of text entry fields that a user can use for additional information, such as notes. Conventional calendar applications also include an electronic-notes section that can be categorized and linked to contacts, not to a date. The disadvantage of this approach is that in order to take advantage of the text fields in conventional electronic calendar, the user must use the calendar program whenever the user is taking notes. This may not be convenient or practical.

Not all notes result in the creation of a calendar entry. Thus, for any note entered into the calendar portion of a conventional calendar application that is not date-related, the user will have to dispose of or copy the note to another application, resulting in the duplication of time and effort.

Conventional electronic calendar applications provide various alternative means for note entry; however, these alternatives also fail to satisfy the need for a simple method and system for creating calendar entries from note entries. For example, many conventional calendar applications include an application for note-entry. Such conventional note-entry applications act as on-screen scratchpads, allowing a user to enter a note and then, if necessary, attach the note to a contact. Unfortunately, entries in such conventional note-entry applications cannot be used to automatically generate a calendar entry; the calendar entry must still be created manually.

Another option for creating calendar entries from electronic notes is to use a separate application to extract information from a note-entry application and to create a corresponding calendar entry. Various applications exist for performing an analogous procedure to extract and create address entries. For example, various applications exist for extracting address information from text files. Conventional versions of ListGrabber and AddressGrabber extract information from a text file, parse the information, and create entries in an electronic address book (ListGrabber and AddressGrabber are produced by eGrabber Inc., a Saratoga, Calif. corporation.). Although these applications are useful for creating electronic address entries, they do not address the need of users to create electronic-calendar entries.

Another option that a user has in conventional software is to add alarms to notes within the note-entry application. An alarm causes the computer to emit some type of message to the user. The alarms are analogous to reminders in a conventional calendar application, which emits a visual and/or aural message to remind a user of a particular event or appointment based on user-specified parameters. 3M company's Post-it® Notes software conventionally allows a user to add such alarms to notes. The primary disadvantage of this approach to creating calendar entries is that the users calendar entries are no longer in a single application, i.e., the user cannot access a single application to determine all of the events that have occurred or that are scheduled to occur on a particular date.

A system and method of creating calendar entries based on entries in a note-entry application is needed to minimize errors and to eliminate the duplication of time and effort inherent in conventional approaches.

SUMMARY

Embodiments of the present invention provide systems and methods to address the need for automated creation of an electronic-calendar entry based on information in a separate application, such as a note-entry application. An embodiment of the present invention comprises a computer system. The computer system includes a graphical user interface (GUI). In a preferred embodiment, the GUI occupies no more than twenty-five percent of the viewable area of the user's computer display. The GUI comprises two fields, a free-form text field for entering a note and a date field. The GUI may also comprise a button for activating a calendar-entry creation function.

In one embodiment of the present invention, when the user activates the calendar-entry creation function, the function automatically creates an entry directly in a calendar store. In another embodiment, the calendar-entry creation function automatically creates a file, which the user's calendar application can import.

The software components of the GUI and calendar-entry creation function may comprise a single executant or multiple executants working in unison. In one embodiment of the present invention, the GUI comprises a note-entry application, such as 3M company's Post-it® note software, and the calendar-entry creation function is integrated into the note-entry application. In another embodiment, the GUI comprises an HTML page displayed in a web browser window, and the calendar-entry creation function comprises a program written in a scripting language, such as JavaScript.

An embodiment of the present invention may also include calendar software. In such an embodiment, the calendar software creates and displays the calendar entry. The calendar software may comprise Microsoft® Outlook, ACT! 2000, or other calendar software application.

An embodiment of the present invention offers numerous advantages over conventional methods of transferring information from a note-entry application to an electronic calendar application. Conventionally, in order to create a calendar entry based on information entered in a note-entry application, a user 1) cuts information from a note-entry application, 2) opens a calendar application, 3) creates a calendar entry on the desired day and at the desired time, and 4) pastes the note-entry information from memory into the calendar entry. An embodiment of the present invention saves the user time and effort by allowing the user to perform a single mouse click to effectuate the same four-step process.

A time savings may convert directly to an expense savings for the user's employer. But even if the expense savings is not direct, time saved by utilizing an embodiment of the present invention provides the user with the opportunity to perform other tasks, potentially saving or earning the user's employer additional revenue or reducing expenses.

An embodiment of the present invention also eliminates errors. Any time a user must enter the same information multiple times, the potential for error exists. If the user has entered the date information correctly in the note-entry application, the possibility for an error to occur when creating the calendar entry may be virtually eliminated by an embodiment of the present invention.

Also, although existing applications for extracting information from a text-based application can extract address information and place that information in the user's contact list, these applications do not handle date information. An embodiment of the present invention addresses the need to extract date information in order to create electronic calendar entries. An embodiment of the present invention is also more flexible than existing approaches to creating calendar entries based on a note-entry application.

Further details and advantages of the present invention are set forth below

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for automatically creating an electronic-calendar entry from an application, such as a note-entry application. An embodiment of the present invention includes a graphical user interface (GUI) and a software component to create a calendar entry from controls present in the GUI.

In an embodiment of the present invention, the GUI may occupy a small portion of the viewable area on a user's screen. The GUI is preferably very simple to use and includes only a very limited number of controls. These controls include a control capable of accepting and displaying a text entry and another control capable of accepting and displaying a date entry and minimal additional controls. The software component is activated from the GUI and is capable of using the text and date entry to automatically create a calendar entry in an electronic calendaring program or, alternatively, a calendar entry in a file structured based on a standardized file format.

Figure 1:
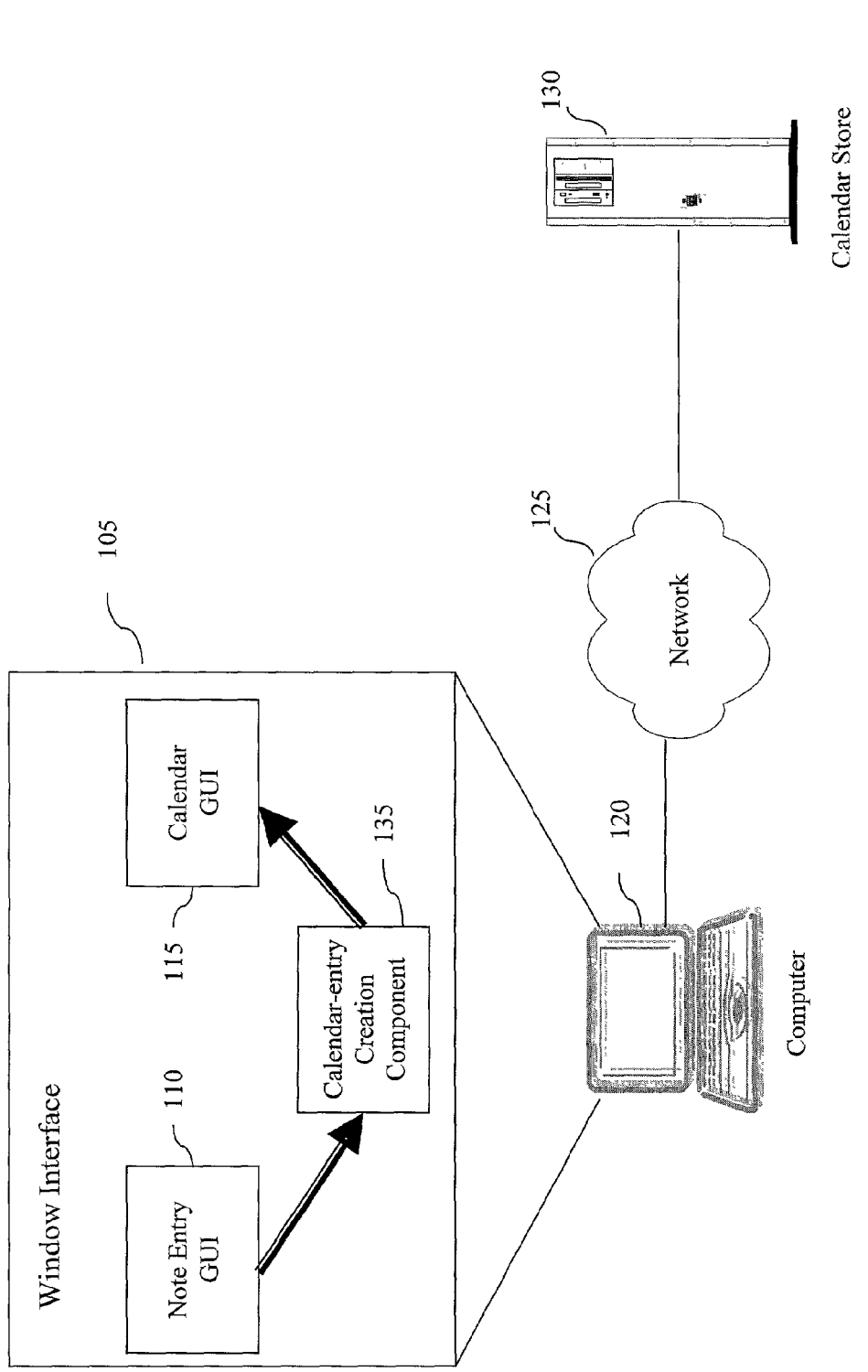
FIG. 1 is a diagram of an exemplary environment for operation of an embodiment of the present invention.

FIG. 1 illustrates a computer system for implementing an embodiment of the present invention. The computer system in FIG. 1 includes a computer 120. Computer 120 shown in FIG. 1 is an IBM-compatible laptop. However, an embodiment of the present invention may comprise a Macintosh, Unix workstation, Internet appliance, personal digital assistant, or other device capable of displaying a GUI.

The computer 120 shown in FIG. 1 is capable of displaying a window interface 105. The window interface 105 in FIG. 1 comprises Microsoft® Windows. An embodiment of the present invention may employ other window interfaces, such as the Mac OS or the GNOME desktop environment.

An embodiment of the present invention comprises a note-entry application, displaying a note-entry GUI 110. The note-entry GUI 110 is designed to occupy a limited percentage of the total screen area of the window interface 105. The purpose for limiting the size of the note-entry GUI 110 is so that it is less intrusive with regard to other user interfaces that are displayed concurrently within the window interface 105. Just as with paper-based notes, the note-entry GUI 110 may be used for a wide variety of purposes, including to record critical information from telephone calls, recording reminders, or recording other similar information suitable to creation as a brief note.

The note-entry GUI 110 may also be limited in functionality. In an embodiment of the present invention, the note-entry GUI 110 provides the user of the system with the ability to quickly create notes, and from these notes, automatically create electronic calendar entries. In such an embodiment, as in the embodiment shown, the note-entry GUI 110 is meant to serve only this limited role, and thus, is limited in functionality. In other embodiments, the note-entry GUI 110 is not limited in functionality.

The embodiment shown in FIG. 1 also comprises a calendar-entry creation component 135. The calendar-entry creation component 135 of the embodiment shown comprises a stand-alone program capable of automatically creating a calendar entry. In other embodiments, the calendar-entry creation component 135 comprises a series of components, either stand-alone applications or sub-components of other applications. The calendar-entry creation component extracts information from the note-entry application's 110 user interface and uses the information to create a calendar entry in a calendar application, which may be displayed in the calendar GUI 115. The calendar-entry creation component may create the calendar entry in response to an action by the user or based on user-configurable parameters entered by a user prior to note entry.

In the embodiment shown in FIG. 1, the calendar application 115 executes within the same window interface 105 as the note-entry GUI 110. However, an embodiment of the present invention is not limited to working with a calendar application which is capable of displaying a GUI 115 in the same window interface 105 and may include a web service, remote automation component or other similar means. Examples of conventional calendar applications include Microsoft® Outlook and Interact Commerce Corporation's ACT!™ 2000

Conventionally, access to networks, including the Internet, is common. Therefore, users are able to store calendaring information in a variety of locations. Such locations are referred to as calendar stores. A calendar store comprises a data store for a calendar service. The calendar service may comprise multiple calendar stores, and the calendar store may comprise multiple calendars. For example, a calendar service on the Internet may include the calendar stores for many organizations. Each organization's calendar store may include a calendar for each of the users within the organization.

In the embodiment of the present invention shown in FIG. 1, the computer 120 is attached to a network 125. Network 125 comprises an intranet, but in other embodiments the network may comprise a government network, a wide area network, or a public network, such as the Internet. A server 130 comprising a calendar store is also connected to the network 125. The note-entry GUI 110 creates a calendar entry in the calendar application 115, and the calendar application 115 stores the calendar entry in the user's calendar in the calendar store 130. The computer 120 shown in FIG. 1 may also comprise a calendar store for an individual user's calendar. It may be stored on the computer 120 and backed up across the network 125 to the calendar store on the network server 130, or the local and remote stores may be synchronized periodically to provide portability to the user.

Figure 2:
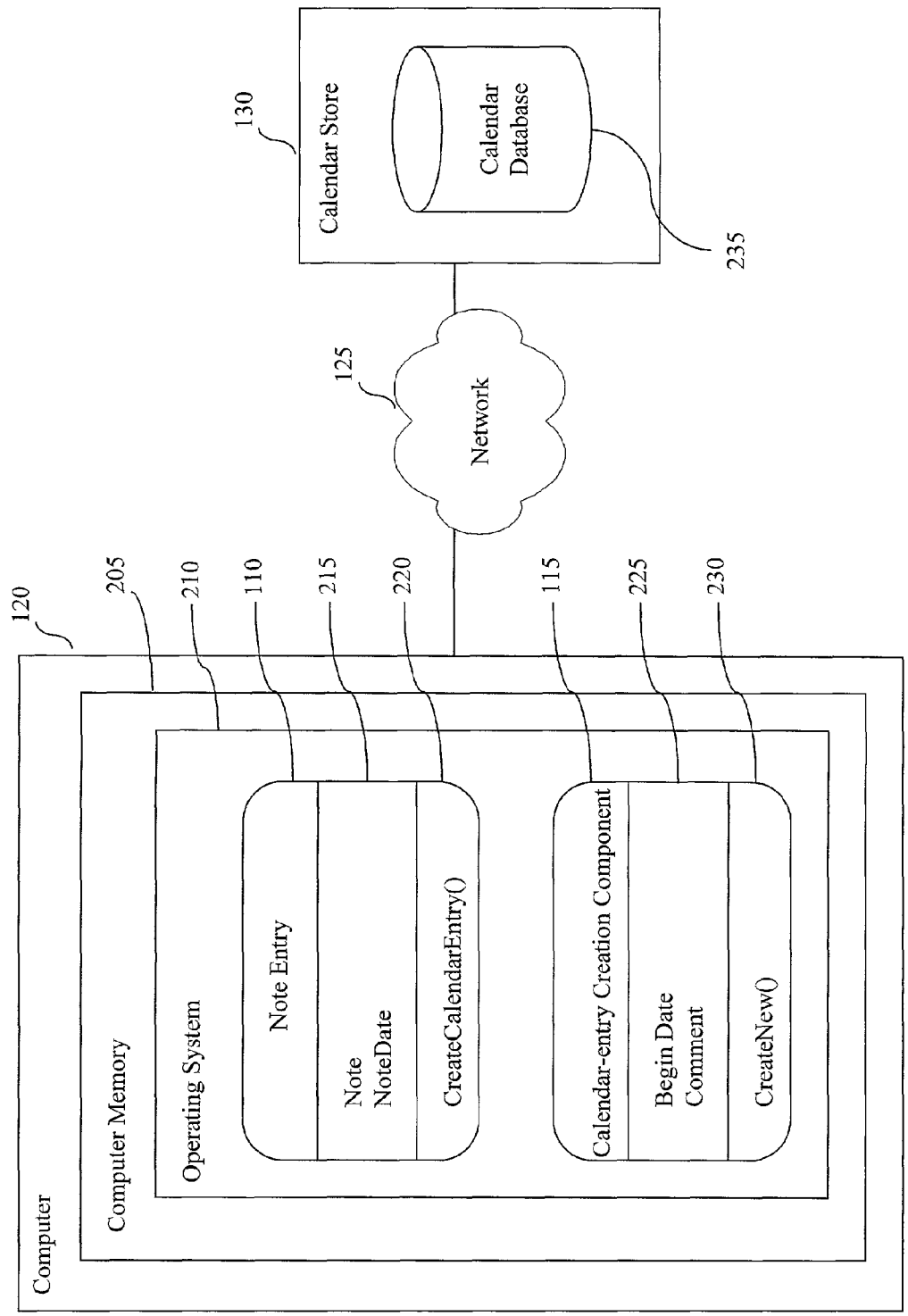
FIG. 2 is a block diagram illustrating the operation of the various software components in an embodiment of the present invention.

An embodiment of the present invention accomplishes tasks via various software components. FIG. 2 is a block diagram illustrating relationships between the various software components in an embodiment of the present invention. The software components illustrated in FIG. 2 function within the various hardware and user interface components illustrated in FIG. 1.

The primary components of the computer 120 are a processor (not shown), memory 205, a chipset (not shown), and some type of non-volatile memory (not shown), such as a hard disk drive. The chipset connects the various components of the computer 120, including the processor, memory 205, hard disk drive and input/output interfaces. In order to make use of the computer 120, an operating system 210 is installed on the computer 120. The operating system executes within the memory 205 of the computer 120.

The operating system 210 commonly includes a window interface 105 as shown in FIG. 1. Software applications, such as the note-entry GUI 110 and calendar GUI 115 of the present invention, execute within the operating system 210. Software applications operating within an operating system 210 are generally able to share information with other software applications. The sharing may occur through various means, including the sharing of files or through a form of object orientation.

Object-oriented programming allows a first software component to treat a second software component as a black box. The second software component exposes attributes to external software programs, including the first software component. These attributes comprise properties, which are variables that can be set by external programs, and methods, which are functions or algorithms that can be executed by external programs. One advantage of object-oriented programming is that common algorithms may be created in an object and used by multiple applications; the code is not duplicated in each application that requires a common functionality.

For example, a math education software application includes routines for displaying the calculated area of various geometric shapes, including a triangle, based on inputs from a user. To calculate the area of the triangle, the application utilizes a triangle object. The triangle object includes two properties, base and height, and a method, calculateArea. Within the triangle object, the calculateArea method contains programming code to calculate the area based on the properties, e.g., area=½ base*height.

In order to determine the area of a triangle, the math education software application creates an instance of the triangle object, e.g., dim objTri as new Triangle. The application then sets the base and height properties based on user entries, e.g., objTri.base=2. Finally, the application sets a variable equal to the calculateArea method, e.g., Area=objTri.calculateArea. The area of the triangle is now stored in the variable, Area, and the application can utilize this variable to display the result of the calculation. The programmer is not required to create the code necessary to calculate the area of the triangle. Although the preceding example is a very simple one, the ability to use objects in this manner greatly simplifies the task of programming complex tasks.

The Microsoft® Windows family of operating systems provides basic object-oriented functionality through the use of ActiveX servers. If a program is an ActiveX server, other programs can create an instance of the ActiveX server, set various properties of the ActiveX server and execute its methods.

For example, for reasons of efficiency, a software developer wishing to perform linear regression would avoid writing a new program to perform the regression. Linear regression is a common mathematical algorithm implemented by numerous conventional applications, such as Microsoft® Excel. Microsoft® Excel is also capable of performing as an ActiveX server.

A developer wishing to perform linear regression writes a software application, containing programming code to create an instance of Microsoft® Excel and execute the linear regression method within Microsoft® Excel. The instance of Microsoft® Excel returns the results of the linear regression calculation to the developer's application.

An embodiment of the present invention, as illustrated in FIG. 2, implements a related procedure to create calendar entries. The note-entry GUI 110 comprises Note and Note-Date fields 215. The user enters values into the Note and NoteDate fields 215 using a keyboard, stylus, or other input device. Within the software code underlying the note-entry GUI 110 are also various functions, including a CreateCalendarEntry function 220.

A function is a portion of code in a software application that executes in response to some action on the part of the user or some event within the program. For example, the note-entry GUI 110 may comprise a button labeled "Create Calendar Entry", which upon activation executes the CreateCalendarEntry function 220. Activation may occur via mouse click, key sequence, or other means, Once the user has completed entry in the Note and Note-Date fields 215, the user clicks the "Create Calendar Entry" button, triggering execution of the CreateCalendarEntry function 220 and further, causing a calendar entry to be created based on the values in the note-entry GUI's fields 215.

The CreateCalendarEntry function 220 utilizes an object to actually create the calendar entry. The application underlying the calendar GUI 115 shown in FIG. 2 may comprise the calendar-entry creation component 135 and may be treated as an object. The calendar application 115 comprises properties 225 and methods 230, including a BeginDate property, a Comment property, and a CreateNew method 230.

When a user using the note-entry GUI 110 indicates that a new calendar entry is to be created, the note-entry GUI 110 executes its CreateCalendarEntry function 220. The CreateCalendarEntry function 220 creates an instance of the calendar application object 115, sets the BeginDate property equal to the value in the NoteDate field, sets the Comment property equal to the value in the Note field, and executes the CreateNew method 230 of the calendar object 115.

The CreateNew method 230 contains all of the code necessary to create a calendar entry in the proper form for the user's calendar and to store the calendar entry in the user's calendar store. Utilizing the calendar application 115 as an object allows the developer to include a calendar entry creation function in the note-entry GUI 110 without having to recreate all of the code necessary to create a calendar entry directly in the calendar store 130, simplifying both initial development and ongoing support by limiting the size of the note-entry GUI 110 and underlying application.

A user's calendar must be stored in some type of non-volatile storage medium, such as a magnetic disk. In the embodiment shown in FIG. 2, the user's calendar is stored in calendar database 235 located on a network calendar store 130. The calendar database 235 may comprise a proprietary database or may comprise a common relational database. The CreateNew method 230 creates a new calendar entry in the calendar database 235 across the network 125.

The software illustrated in FIG. 2 may comprise various programming languages. For example, all of the components may be written in a single language, such as Microsoft's Visual Basic or Visual C++. Combinations of these languages may also be used and combined together as components. Within the Microsoft® Windows family of operating systems, a special type of executable may be created that can be utilized in the same memory space as the calling executable. This executable is called a dynamic link library (dll). Dynamic link libraries serve a variety of purposes and are generally used to provide functionality that may be reused and shared among a plurality of applications.

Other combinations of software components may be utilized as well. The note-entry GUI 110 may comprise a markup language page, such as hypertext markup language (HTML). The calendar entry creation component 135 in an embodiment of the current invention, utilizing an HTML page, may comprise a program written in a scripting language, such as Java Script. If properly enabled in the operating environment, a scripting language is capable of creating an instance of an ActiveX server or other software component and executing its functions or methods as described herein.

Figure 3:
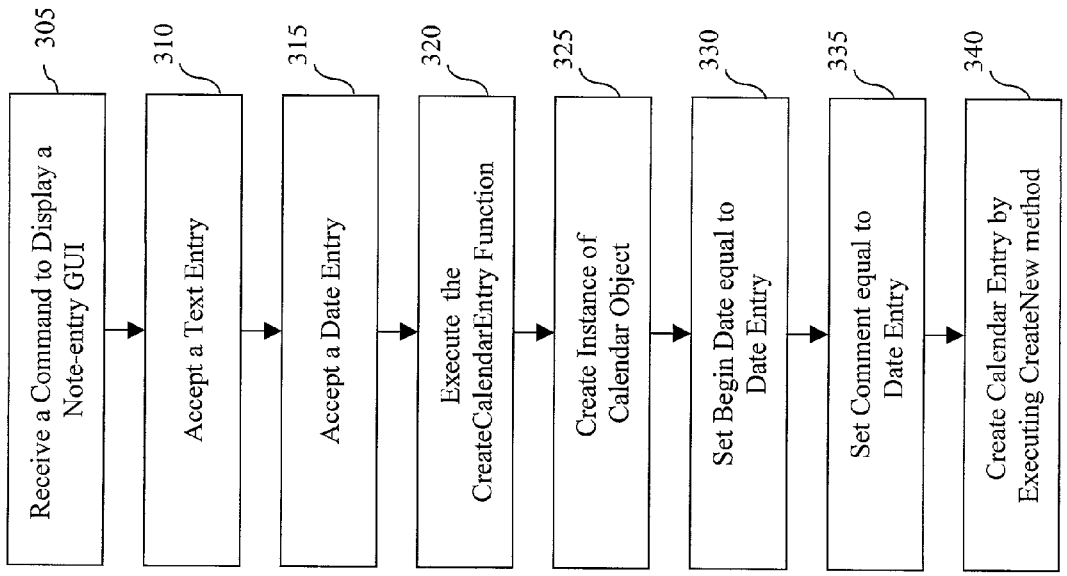
FIG. 3 is a flowchart illustrating an exemplary method for creating an electronic-calendar entry in an embodiment of the present invention.

FIGS. 1 and 2 illustrate various levels of detail of the computing environment in which an embodiment of the present invention operates. FIG. 3 is a flowchart illustrating the process an embodiment of the current invention utilizes within the computing environment. An embodiment of the present invention advantageously implements the process shown in FIGS. 3 and 5 by utilizing a program executed from a computer-readable medium, such as the random access memory of computer 120. The program may be stored on a computer-readable medium such as a magnetic disk, an optical disk, a tape, or a read-only memory (ROM).

Referring again to FIG. 3, the user instructs the computer 120 to display the note-entry GUI 110, and the computer 120 receives the command 305. The user may so instruct the computer by using a menu, or the user may click a taskbar tray icon, such as the volume control present in the Microsoft® Windows family of operating systems. In an embodiment of the present invention, the taskbar tray icon resembles a miniature sticky note.

The user then types information into the note-entry GUI 110. The note-entry GUI 110 accepts a text entry 310 and a date entry 315. Accepting the entry of the text and date may simply comprise providing a simple text box control. Various other methods are also feasible. For example, the text entry control may include spell-checking and formatting capability. The date entry control may include a pictorial representation of a calendar to simplify date entry.

After entering the text and date, the user executes the CreateCalendarEntry function 220, 320. The user may accomplish the execution by clicking a button on the note-entry GUI 110 user interface, utilizing a menu, pressing a hot-key sequence, or other means of executing or activating an application within the window interface 105.

The CreateCalendarEntry function 220 first creates an instance of the calendar application 115 as an object 325. Next, the function 220 sets the BeginDate property of the calendar object equal to the date entry 335 and then sets the Comment property equal to the text entry 340. Then, the CreateCalendarEntry function 220 executes the CreateNew method 230 of the calendar object 115, causing the calendar object 115 to store the calendar entry in the calendar store's 130 calendar database 235, 340.

Figures 4A, 4B:
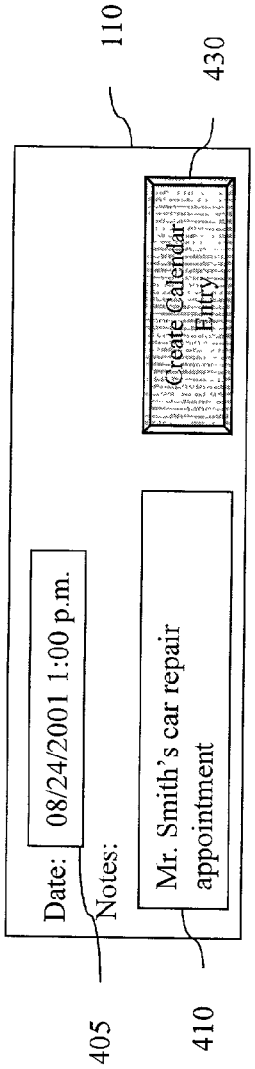
FIGS. 4A and 4B illustrate a representative note entry and calendar application in an embodiment of the present invention.

FIGS. 4A and 4B are screen shots of the graphical user interface of an embodiment of the present invention. As described above, the note-entry GUI 110 is of limited size and limited function. In the embodiment shown in FIG. 4A, the note-entry GUI 110 comprises a date field 405 and a notes-entry field 410. The user of computer 120 accesses the CreateCalendarEntry function 220, as described in FIGS. 2 and 3, via a hot-key sequence, such as Alt-Ctrl-c. When the hot-key sequence is pressed, the CreateCalendarEntry function 220 creates a calendar entry 340.

In the embodiment shown, the resulting calendar entry is displayed in a calendar application 115 as shown in FIG. 4B. FIG. 4B illustrates the calendar application 115 configured by the user to display the entries for a single day, Aug. 24, 2001 415. In the embodiment shown in FIG. 4B, the day on the calendar 415 includes a single entry 425. The entry in the calendar 115 includes, "Mr. Smith's car repair appointment" as the comment 425. As expected, this comment is equal to the notes value 410 in the note-entry GUI 110 shown in FIG. 4A. Also, the calendar entry begins at 1:00 p.m. 420. Also as expected, this date and time match the date entry 405 in the note-entry GUI 110 shown in FIG. 4A.

Figure 5:
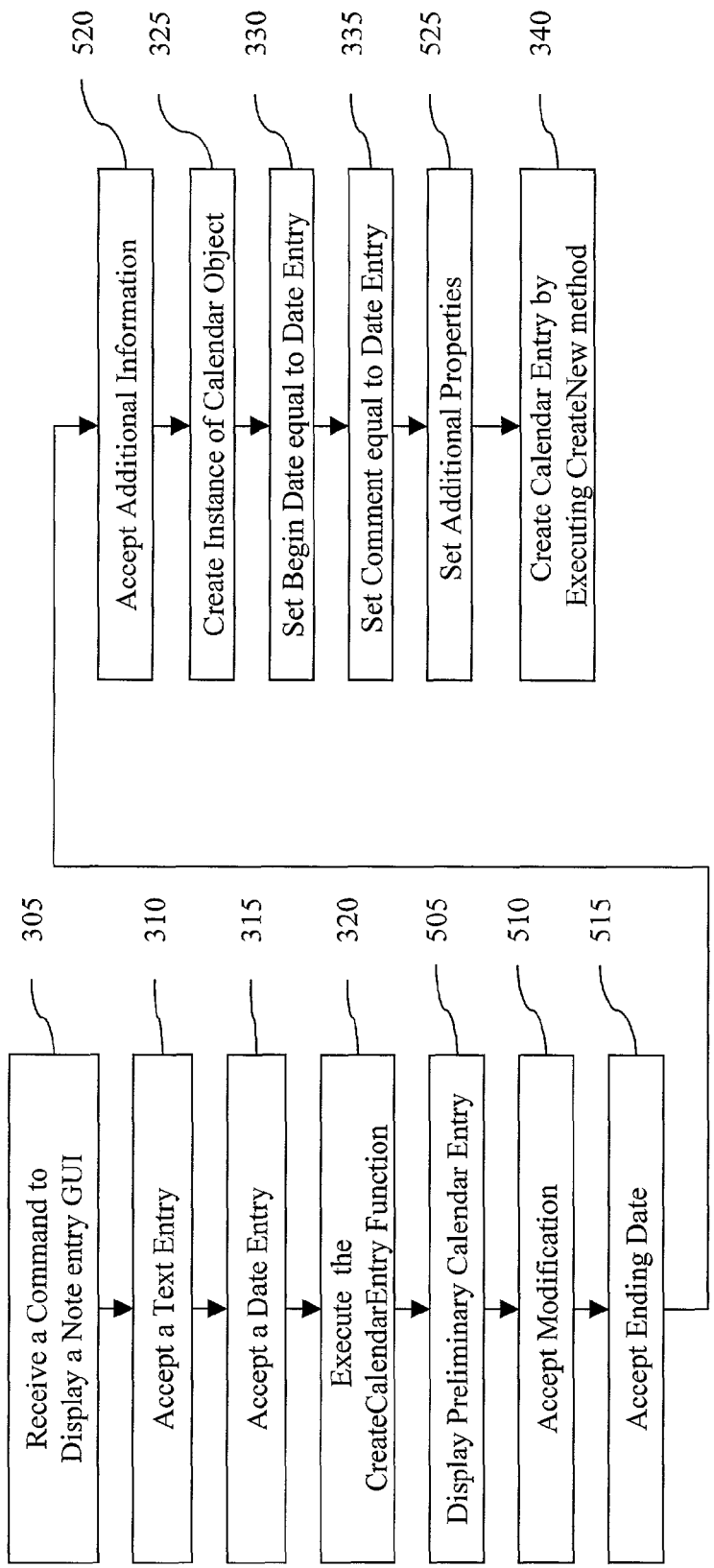
FIG. 5 is a flowchart illustrating additional steps in a method for creating an electronic-calendar entry in an embodiment of the present invention.

FIG. 3 illustrates the basic steps necessary to create an electronic-calendar entry in an embodiment of the present invention. But a developer may add additional steps to the process to enhance the functionality of the application for a user. For example, FIG. 5 illustrates another embodiment of a method according to the present invention. The method of FIG. 5 includes the steps shown in FIG. 3 as well as additional steps, which may be incorporated to enhance the calendar-entry creation process.

In the method shown in FIG. 5, as in FIG. 3, the application first receives a command from the user that activates the display of the note-entry application's 110 graphical user interface (GUI) 305. Next, the user enters a text entry and a date entry, which is received by the computer 310, 315. The user causes the GUI to execute the calendar-entry creation component 135, which in turn executes the CreateCalendarEntry function 220, 320.

The process executed by the calendar-entry creation component 135 shown in FIG. 5 then diverges from that shown in FIG. 3. Rather than creating a calendar entry directly in the calendar store 130, the calendar-entry creation component 135 displays a preliminary-calendar-entry user interface comprising a preliminary calendar entry 505. The preliminary-calendar-entry user interface provides the user with an opportunity to view and/or modify the preliminary calendar entry before creating an entry in the calendar store 130. Displaying a preliminary entry provides numerous advantages over conventional systems, including the ability to verify information used to create the calendar entry.

For example, a user may decide to include only a portion of the text in the note as the text entry associated with a calendar entry. Also, the user may decide to schedule the event on a recurring basis. An embodiment of the present invention may provide capabilities such as these to the user.

In one embodiment of the present invention, the preliminary calendar-entry user interface comprises BeginDate and Comment fields corresponding to the BeginDate and Comment properties 225, respectively, of the calendar application 115 as described in FIG. 2. The preliminary-calendar-entry user interface accepts modification to these two fields 510.

The user may decide to change the text, adding or deleting material appropriate to an event in the calendar.

In addition to accepting modification to the basic fields, the interface also accepts an ending date 515 and additional calendar-entry-related information 520. The additional calendar-entry-related information may include, for example, the recurrence schedule of the event. The ending date and additional calendar-entry-related information provide the user more flexibility in creating a calendar entry than available in the more basic process illustrated in FIG. 3.

Once the modifications 510, ending date 515, and additional information 520 have been accepted, the interface continues with the process illustrated in FIG. 3. The CreateCalendarEntry function 220 creates an instance of the calendar application 115, 325 and sets the BeginDate 330 and Comments properties 335 as shown in FIG. 3. The function 220 performs the additional step of setting any additional properties that are available in the preliminary-calendar-entry interface but are not available in the Note-entry GUI 110 such as the ending date 525. Once the value of any additional properties has been set, the function 220 executes the CreateNew method 230 of the calendar application 115 object 340, completing the enhanced process.

Many variations of this process may be utilized in an embodiment of the present invention. For example, the preliminary calendar entry user interface illustrated in FIG. 5 may simply provide the user with an opportunity to confirm the calendar entries, rather than allowing changes and additional information to be entered. Also, when the calendar entry is created, the CreateCalendarEntry function 220 may display the calendar entry in the calendar application 115 as illustrated in FIG. 4B, in which subsequent modifications may be entered. An advantage to this approach is that the user sees precisely how the calendar entry 425 will appear in the calendar application 115.

Although the examples above describe creation of a calendar entry directly through the use of the calendar application, many other means for creating a calendar entry in an embodiment of the present invention may be utilized. For example, in one embodiment of the present invention a file is created for import into the calendar store.

Conventional electronic calendar applications are capable of importing many different types of files, including, for example, a file in the vCalendar or more recent iCalendar formats. vCalendar is a specification, describing both a transport and a format for exchanging calendar information in an easy, automated, and consistent manner. A number of companies, including Apple, IBM and AT&T, formed the versit Consortium. The object of the consortium was the development of standards for the interoperability of products from multiple vendors. vCalendar was one of the resulting standards. When the versit Consortium disbanded in 1996, they ceded control of the vCalendar specification to the Internet Mail Consortium.

Since that time, various Internet standards for the exchange of calendar information have been developed. For example, RFC 2445 is the iCalendar standard. It is a language used to describe calendar objects and is analogous to RFC 822, the language used to describe email messages. iCalendar provides the format for calendar information which can be used in various contexts, including sending calendar information over a network, drag and drop within a window interface, and import/export.

An embodiment of the present invention creates a file as an iCalendar object. Due to the widespread acceptance of the standard, conventional calendar applications are able to import the newly-created iCalendar object. The following is an example of an iCalendar object for the event illustrated in FIGS. 4A and 4B:

BEGIN:VCALENDAR
PRODID:-//xyz Corp//NONSGML PDA Calendar Version 1.0//
EN VERSION:2.0 BEGIN:VEVENT
DTSTAMP:20010821T120000Z
UID:uid1@host.com ORGANIZER:MAILTO:jsmith@host.com
DTSTART:20010824T130000Z
STATUS:CONFIRMED
DESCRIPTION:Mr. Smith's car repair appointment
END:VEVENT
END:VCALENDAR The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A method, comprising:
    generating, by a processor executing an electronic calendar application, an electronic calendar for display in a graphical window;
    receiving, by the processor, a command entered by a user requesting an electronic note;
    executing, by the processor, a note entry software application in response to the command, the note entry software application separate from the electronic calendar application;
    generating, by the processor executing the note entry software application, a note entry user interface in another graphical window, the note entry user interface comprising a text field, a date field, and a graphical control;
    receiving, by the processor, a window selection from the user that selects the another graphical window generated by the note entry software application;
    receiving text typed by the user into the text field;
    receiving, by the processor, entry of a date and time typed by the user into the date field;
    receiving, by the processor, a control selection of the graphical control;
    setting, in memory, a comment property equal to the text typed into the text field of the another graphical window generated by the note entry software application;
    setting, by the processor, a begindate property equal to the date and time in the date field of the another graphical window generated by the note entry software application;
    executing, by the processor, object-oriented programming that creates a calendar entry in the electronic calendar generated by the electronic calendar application from the comment property and the begindate property; and
    storing, in the memory, the calendar entry associated with the date and time in response to the control selection of the graphical control.

2. The method of claim 1, further comprising storing the calendar entry in a calendar store.

3. The method of claim 1, further comprising storing the calendar entry as a file in the memory.

4. The method of claim 1, further comprising storing the note entry user interface as a web page.

5. The method of claim 1, further comprising extracting the date and time from the text typed by the user into the text field.

6. The method of claim 1, further comprising spell checking the text typed by the user into the text field.

7. The method of claim 1, further comprising displaying the calendar entry.

8. A system comprising:
    a processor; and
    a memory storing a software application that when executed causes the processor to perform operations, the operations comprising:
    displaying an electronic calendar in a graphical window generated by an electronic calendar application;
    receiving a command entered by a user requesting an electronic note;
    executing a note entry software application in response to the command, the note entry software application separate from the electronic calendar application;
    generating a note entry user interface in another graphical window, the note entry user interface comprising a text field, a date field, and a graphical control;
    receiving a window selection from the user that selects the another graphical window generated by the note entry software application;
    receiving text typed by the user into the text field;
    receiving entry of a date and time typed by the user into the date field;
    receiving a control selection of the graphical control;
    setting a comment property equal to the text typed into the text field of the another graphical window generated by the note entry software application;
    setting a begindate property equal to the date and time in the date field of the another graphical window generated by the note entry software application;
    executing object-oriented programming that creates a calendar entry in the electronic calendar from the comment property and the begindate property; and
    storing the calendar entry associated with the date and time in response to the control selection of the graphical control.

9. The system of claim 8, wherein the operations further comprise storing the calendar entry in a calendar store.

10. The system of claim 8, wherein the operations further comprise storing the calendar entry as a file.

11. The system of claim 8, wherein the operations further comprise storing the note entry user interface as a web page.

12. The system of claim 8, wherein the operations further comprise extracting the date and time from the text typed into the text field of the another graphical window generated by the note entry software application.

13. The system of claim 8, wherein the operations further comprise spell checking the text typed into the text field of the another graphical window generated by the note entry software application.

14. The system of claim 8, wherein the operations further comprise displaying the calendar entry.

15. A non-transitory computer readable medium storing code that when executed causes a processor to perform operations, the operations comprising:
    displaying an electronic calendar in a graphical window generated by an electronic calendar application;
    receiving a command entered by a user requesting an electronic note;
    executing a note entry software application in response to the command, the note entry software application separate from the electronic calendar application;
    generating a note entry user interface in another graphical window, the note entry user interface comprising a text field, a date field, and a graphical control;

receiving a window selection from the user that selects the another graphical window generated by the note entry software application;

receiving text typed by the user into the text field;

receiving entry of a date and time typed by the user into the date field;

receiving a control selection of the graphical control;

setting a comment property equal to the text typed into the text field of the another graphical window generated by the note entry software application;

setting a begindate property equal to the date and time in the date field of the another graphical window generated by the note entry software application;

executing object-oriented programming that creates a calendar entry in the electronic calendar from the comment property and the begindate property; and storing the calendar entry associated with the date and time in response to the control selection of the graphical control.

16. The non-transitory computer readable medium of claim 15, wherein the operations further comprise storing the calendar entry in a calendar store.

17. The non-transitory computer readable medium of claim 15, wherein the operations further comprise storing the calendar entry as a file.

18. The non-transitory computer readable medium of claim 15, wherein the operations further comprise storing the note entry user interface as a web page.

19. The non-transitory computer readable medium of claim 15, wherein the operations further comprise extracting the date and time from the text typed by the user into the date field.

20. The non-transitory computer readable medium of claim 15, wherein the operations further comprise spell checking the text typed into the text field.

* * * * *